April 11, 1967 R. W. G. SOMERVELL 3,313,126
COUPLINGS
Filed June 3, 1965 2 Sheets-Sheet 1
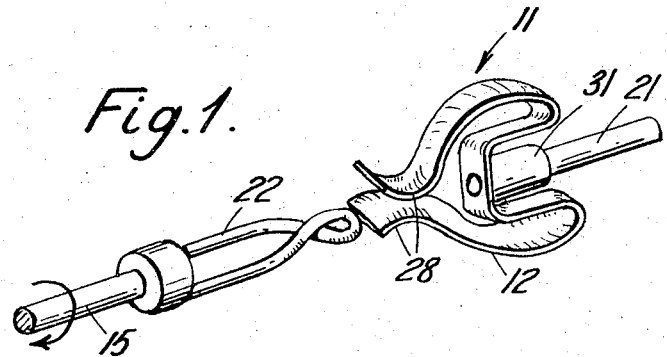
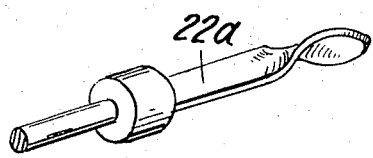
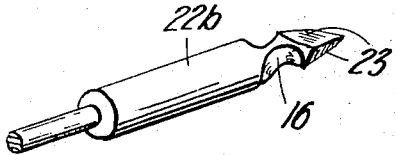
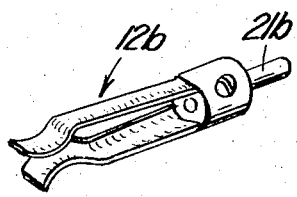

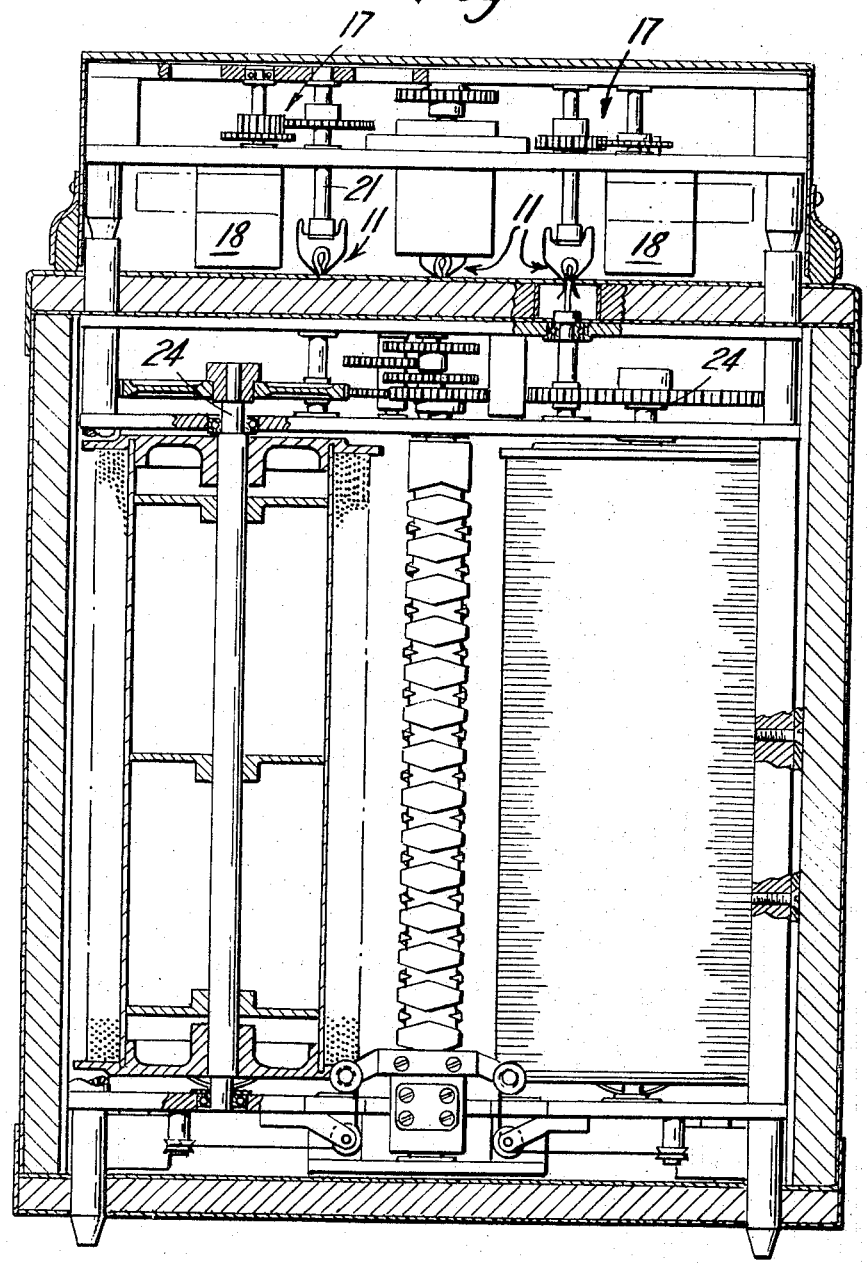

United States Patent Office 3,313,126
Patented Apr. 11, 1967

3,313,126
COUPLINGS
Roland William Gordon Somervell, Beaconsfield, England, assignor to S. Davall & Sons Limited, Greenford, Middlesex, England, a British company
Filed June 3, 1965, Ser. No. 461,137
7 Claims. (Cl. 64—15)

The invention relates to couplings.

The invention provides a coupling for coupling together a driving shaft and a driven shaft, one of the shafts being provided with one coupling member having a noncircular cross section and the other of the shafts being provided with another coupling member comprising two parts biassed together and adapted to receive and grip between them the said one coupling member.

The invention also provides a coupling for coupling together a driving shaft and a driven shaft, which coupling comprises one coupling member having a noncircular cross section and being adapted to be attached to one shaft, and another coupling member comprising two parts biassed together and adapted to be attached to the other shaft and to receive and grip between the two parts the said one coupling member.

The invention also provides a coupling for transmitting rotational drive comprising coupling members, one coupling member having two parts biassed together and adapted to receive another coupling member between them, the said other coupling member presenting to the said parts points for contact spaced apart in a direction perpendicular to the axis of rotation of the coupling, the shape of the said other coupling member being such that as it is pushed between the parts it tends to rotate so as to bring at least three spaced points for contact into contact with the parts.

Preferably the two parts are formed from sprung metal strip.

Specific constructions of couplings embodying the invention will now be described by way of example and with reference to the accompanying drawings in which:

FIGURE 1 shows uncoupled the coupling members of a coupling,

FIGURE 2 shows another coupling member,

FIGURE 3 shows uncoupled the coupling members of another coupling,

FIGURE 4 shows diagramatically a coupling incorporated in a recorder device, and FIGURE 5 shows uncoupled the coupling members of another coupling.

In the example shown in FIGURE 1 one coupling member 11 comprises a spring clip 12 which is formed from sprung metal strip bent so that two parts of the strip are biassed together and are in the form of jaws 28. The sprung metal strip is, in this example, fixed to a sleeve 31 secured to a shaft 21 by means of a grub screw. The other coupling member comprises a loop of wire 22 mounted on a shaft 15.

The loop of wire 22 is twisted slightly so that it turns as the coupling members are pushed into engagement with one another, the wire loop 22 being nipped between the jaws 28 of the spring clip 12. The twist reduces the chance of the jaws 28 of the spring clip 12 engaging the wire loop 22 edge on to make line contact parallel with the axes of the shafts.

FIGURE 2 shows a coupling member which is an alternative to the wire loop 22 and which comprises a flat strip 22a twisted to a shape having the same outline as the wire loop 22 of the example of FIGURE 1.

FIGURE 3 shows an alternative form of spring clip 12b and another alternative coupling member 22b.

The coupling member 22b has cylindrical concave faces 16 cut in it to cooperate with the nip of the clip 12b and the end of the member 22b is sharpened to a point with three facets 23 inclined to the centre line of the faces 16.

FIGURE 4 shows a magnetic wire recording device described in copending U.S. application Serial Numbers 461,138 and 461,139, filed June 3, 1965, and 478,073, filed August 9, 1965, in which a coupling of the type hereinbefore described is incorporated to transmit drive from gears 17, driven by motors 18, to spindles 24 of the drums 13, 14, which store the wire of the recording device.

FIGURE 5 shows a further alternative form of spring clip 12c in which two shaped strips of sprung metal are screwed to a block 32 to form the jaws 28c of the spring clip. Shaft 21c is received in a bore in the block 32 and secured by a grub screw.

In the example shown in FIGURE 5, coupling member 22c is in the form of a flat strip formed on the end of shaft 15c.

The couplings of these examples are capable of transmitting drive despite inaccurate alignment of the shafts 15, 21 e.g. if the shafts are parallel but slightly out of line, or if the shafts are skew or both skew and out of line. Axial movement can be accommodated to an extent limited by the length and shaping of the coupling member 22 (or 22a, or 22b or 22c) and the length of the spring clip.

In these examples it has been found that some resilience in the coupling member, which is inserted between the jaws of the spring clip, improves the operation of the coupling.

The invention is not restricted to the details of the foregoing examples.

I claim:

1. A coupling for transmitting rotational drive comprising coupling members, one coupling member having two parts biassed together and adapted to receive another coupling member between them, the said other coupling member presenting to the said parts points for contact spaced apart in a direction perpendicular to the axis of rotation of the coupling, the shape of the said other coupling member being such that as it is pushed between the parts it tends to rotate so as to bring at least three spaced points for contact into contact with the parts.

2. A coupling for transmitting rotational drive as claimed in claim 1, in which the said two parts are formed from sprung metal strip.

3. A coupling for coupling together a driving shaft and a driven shaft which coupling comprises coupling members provided respectively on each of the shafts, one coupling member comprising a spring clip which is formed from sprung metal strip bent so that two parts of the strip are biassed together and are in the form of jaws, the sprung metal strip being fixed to a sleeve secured to the shaft, the other coupling member comprising a loop of wire mounted on the other shaft, the loop of wire being twisted slightly so that it turns as the coupling members are pushed into engagement with one another, the wire loop being nipped between the jaws of the spring clip, the said twist reducing the chance of the jaws of the spring clip engaging the wire loop edge on to make line contact parallel with the axes of the shafts.

4. A coupling for coupling together a driving shaft and a driven shaft which coupling comprises coupling members provided respectively on each of the shafts, one coupling member comprising a spring clip which is formed from sprung metal strip bent so that two parts of the strip are biassed together and are in the form of jaws, the sprung metal strip being fixed to a sleeve secured to the shaft, the other coupling member comprising a flat strip twisted slightly so that it turns as the coupling members are pushed into engagement with one another, the flat strip being nipped between the jaws of the spring clip, the said twist reducing the chance of the jaws of the spring clip engaging the flat strip edge on to make line contact parallel with the axes of the shafts.

5. A coupling for coupling together a driving shaft and a driven shaft in a magnetic wire recording device comprising coupling members provided respectively on each of the shafts, one coupling member comprising a spring clip formed from sprung metal secured externally to the shaft and having two parts with free ends biassed together and bent into curves which approach one another and diverge towards the free ends of the said parts of sprung metal, the other coupling member comprising a thin flat strip on the end of the other shaft.

6. A coupling as claimed in claim 5, transmitting drive with the shafts parallel but slightly out of line.

7. A coupling as claimed in claim 5 transmitting drive with the shafts skew or both skew and out of line.

References Cited by the Examiner

UNITED STATES PATENTS

| 2,688,857 | 9/1954 | Jones | 64—29 |
| 3,157,455 | 11/1964 | Takano | 287—126 X |
| 3,187,521 | 6/1965 | Morris et al. | 64—27 X |
| 3,245,022 | 4/1966 | Goerg | 64—27 X |

FOREIGN PATENTS 484,605   7/1917   France.

FRED C. MATTERN, Jr., *Primary Examiner.*

HALL C. COE, *Examiner.*